US007309851B2

(12) United States Patent
Huang et al.

(10) Patent No.: US 7,309,851 B2
(45) Date of Patent: Dec. 18, 2007

(54) APPARATUS AND METHOD FOR ADJUSTING BRIGHTNESS VIA CONTROLLING BACKLIGHT

(75) Inventors: Yu-Hsiang Huang, Taipei Shien (TW); Ming-Horng Shiu, Miaoli Shien (TW); Hsin-Hung Lee, Fongshan (TW)

(73) Assignee: Quanta Computer Inc. (TW)

(*) Notice: Subject to any disclaimer, the term of this patent is extended or adjusted under 35 U.S.C. 154(b) by 0 days.

(21) Appl. No.: 11/413,329

(22) Filed: Apr. 28, 2006

(65) Prior Publication Data

US 2006/0249660 A1 Nov. 9, 2006

(30) Foreign Application Priority Data

Feb. 17, 2006 (TW) .............................. 95105312 A

(51) Int. Cl.
*G05D 25/00* (2006.01)
*G09G 3/36* (2006.01)

(52) U.S. Cl. ............................... 250/205; 250/214 AL; 345/84; 345/87; 345/102; 345/207; 345/589; 345/690

(58) Field of Classification Search ................ 250/205, 250/214 AL, 208.1; 345/389, 84, 87, 102, 345/589, 207, 690; 349/61, 62
See application file for complete search history.

(56) References Cited

U.S. PATENT DOCUMENTS 6,529,212 B2 * 3/2003 Miller et al. ................ 345/690
6,952,195 B2 * 10/2005 Arakawa .................... 345/102
7,038,186 B2 * 5/2006 De Brabander et al. . 250/208.1
7,202,458 B2 * 4/2007 Park ........................... 250/205
2003/0210221 A1 * 11/2003 Aleksic ...................... 345/102
2005/0057484 A1 * 3/2005 Diefenbaugh et al. ...... 345/102
2005/0057485 A1 * 3/2005 Diefenbaugh ............... 345/102
2006/0187233 A1 * 8/2006 Diefenbaugh et al. ...... 345/591

* cited by examiner

*Primary Examiner*—Davienne Monbleau
(74) *Attorney, Agent, or Firm*—Andrew D. Fortney

(57) ABSTRACT

The invention discloses an apparatus for adjusting an output back light relative to the ith image frame among N image frames of an image sequence inputted to a display system. The apparatus includes an optical sensing module, a memory unit, an image processing module, and a back light module. The optical sensing module is used for sensing a current environmental light. The memory unit is used for storing a look-up table in which a plurality of environmental light values, a plurality of brightness ratios, and a plurality of back light adjusting parameters are recorded. Each of the environmental light values corresponds to the brightness ratios and the back light adjusting parameters, and each of the back light adjusting parameters corresponds to one of the brightness ratios. The image processing module is used for calculating a current brightness ratio relative to the ith image frame and for further determining the back light parameter in accordance with the current environmental light, the current brightness ratio, and the look-up table. The back light module is used for adjusting the output back light in accordance with the back light adjusting parameter.

10 Claims, 3 Drawing Sheets

APPARATUS AND METHOD FOR ADJUSTING BRIGHTNESS VIA CONTROLLING BACKLIGHT

BACKGROUND OF THE INVENTION

1. Field of the Invention

This present invention relates to an adjusting brightness apparatus and an adjusting brightness method, and more particularly, to an adjusting brightness apparatus and an adjusting brightness method for adjusting the output back light relative to an image sequence inputted to a display system.

2. Description of the Prior Art

The brightness of a liquid crystal display (LCD) is provided by a back light module in general. By controlling the distortion of the liquid crystal, the transmittance of the back light can be changed to determine the image brightness. Currently, LCD displaying is mostly performed via a cold cathode fluorescent lamp (CCFL). When a user watches an image via LCD under a dark environment, his eyes will feel uncomfortable due to the glaring light of the LCD. When watching a dark image via LCD, the contrast of the whole image decreases because the intensity of the back light is constant In the prior art, there are already some LCDs using a light sensor for sensing the environmental light, so as to adjust the back light according to the change of the environmental light. However, said prior art only adjusts the back light according to the environmental light and not according to the image brightness. When the environmental light is darker, and the image is also dark, the contrast still decreases, thus affecting the effect of the image display.

Accordingly, a scope of the present invention provides an adjusting brightness apparatus and an adjusting brightness method for adjusting the output back light to solve the problem mentioned above.

SUMMARY OF THE INVENTION

A scope of the present invention provides an adjusting brightness apparatus and an adjusting brightness method for adjusting the output back light. The adjusting brightness apparatus adjusts the output back light relative to the image frame according to both the change of the environmental light and the brightness of the image frame. Therefore, the quality of the image is improved.

According to a preferred embodiment of the present invention, an adjusting brightness apparatus adjusts the output back light relative to the ith image frame among N image frames of an image sequence inputted to a display system, wherein N is a natural number, and i is a integer index ranging from 1 to N. The adjusting brightness apparatus includes an optical sensing module, a memory unit, an image processing module, and a back light module.

According to the preferred embodiment, the optical sensing module senses a current environmental light. The memory unit is used for storing a look-up table, in which a plurality of environmental light values, a plurality of brightness ratios, and a plurality of back light adjusting parameters are recorded. Each of the environmental light values corresponding to the brightness ratios and the back light adjusting parameters. Each of the back light adjusting parameters corresponding to one of the brightness ratios. The image processing module receives the current environmental light, calculates a current brightness ratio of the ith image frame, and according to the current environmental light, the current brightness ratio, and the look-up table, determines the back light adjusting parameters corresponding to the current brightness ratio. The back light module receives the back light adjusting parameters corresponding to the current brightness ratio and adjusts the output back light of the ith image frame according to the current brightness ratio.

Accordingly, the adjusting brightness apparatus of the present invention adjusts the output back light relative to the image frame according to both the change of the environmental light and the brightness of the image frame, so as to effectively enhance the contrast when both the environmental light and the image frame are dark. Therefore, the quality of the image is improved.

The advantage and spirit of the invention may be understood by the following recitations together with the appended drawings.

BRIEF DESCRIPTION OF THE APPENDED DRAWINGS

DETAILED DESCRIPTION OF THE INVENTION

Figure 1:
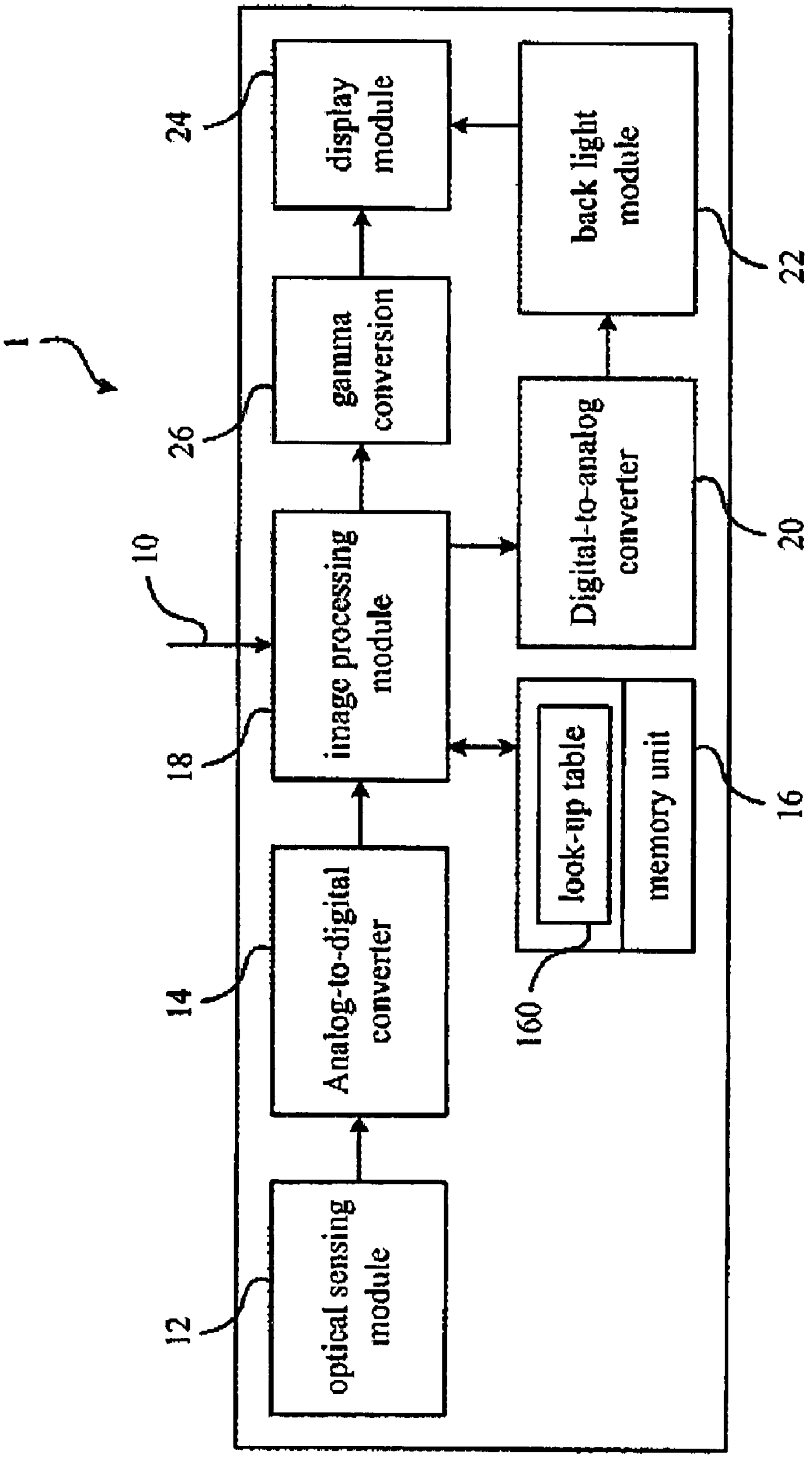
FIG. 1 is a function block diagram of the adjusting brightness apparatus 1 according to a preferred embodiment of the invention.

Referring to FIG. 1, FIG. 1 is a function block diagram of an adjusting brightness apparatus 1 according to a preferred embodiment of the invention. According to the preferred embodiment, the adjusting brightness apparatus 1 adjusts an output back light relative to the ith image frame among N image frames of an image sequence 10 inputted to a display system (not shown in FIG. 1), wherein N is a natural number, and i is a integer index ranging from 1 to N. The image frames of the image sequence 10 are in RGB color space.

As shown in FIG. 1, the adjusting brightness apparatus 1 includes an optical sensing module 12, an analog-to-digital converter (A/D converter) 14, a memory unit 16, an image processing module 18, a digital-to-analog converter (D/A converter) 20, a back light module 22, and a display module 24.

According to the preferred embodiment, the optical sensing module 12 senses a current environmental light. Because the optical sensing module 12 senses the current environmental light in analog signal, the A/D converter 14 is used to convert the detected current environmental light from an analog signal to a digital signal.

Figure 2:
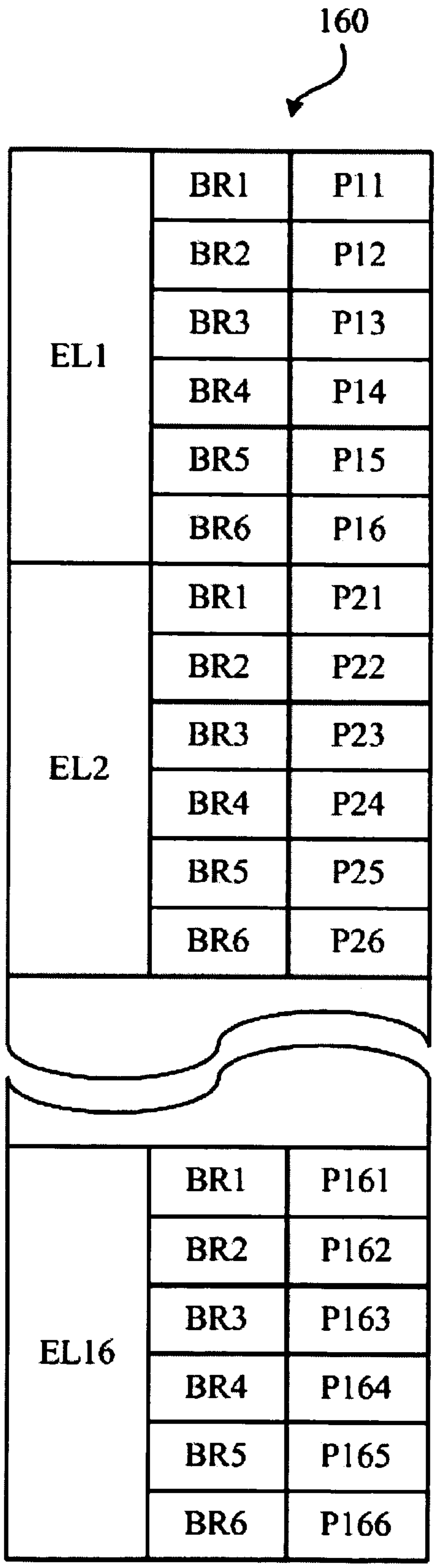
FIG. 2 is a portion of the look-up table 160 in FIG. 1.

Referring to FIG. 2, FIG. 2 is a portion of a look-up table 160 in FIG. 1. The memory unit 16 is used for storing the look-up table 160, in which a plurality of environmental light values, EL#, a plurality of brightness ratios, BR#, and a plurality of back light adjusting parameters, P#, are recorded. Each of the environmental light values, EL#, corresponds to a plurality of brightness ratios, BR#, and a plurality of back light adjusting parameters, P#. Each of the back light adjusting parameters, P#, corresponds to one of the brightness ratios, BR#. As shown in FIG. 2, environmental light values, $EL_1$ to $EL_{16}$, are recorded in the look-up table 160. Each of the environmental light values, $EL_1$ to $EL_{16}$, corresponds to six of the brightness ratios, BR1 to BR6, and six of the back light adjusting parameters, $P_{11}$ to $P_{16}$, $P_{21}$ to $P_{26}$, . . . , $P_{161}$ to $P_{166}$.

The image processing module 18 receives the current environmental light converted by the A/D converter 14. The image processing module 18 calculates a current brightness ratio of the ith image frame of the image sequence 10, and according to the current environmental light, the current brightness ratio, and the look-up table 160, the image processing module 18 determines the back light adjusting parameter corresponding to the current brightness ratio. Because the back light adjusting parameter determined by the image processing module 18 is a digital signal, the D/A converter 20 converts the back light adjusting parameter from a digital signal to an analog signal. The back light module 22 receives the back light adjusting parameter, which is converted by the D/A convert 20 and is corresponding to the current brightness ratio, and the back light module 22 adjusts the back light relative to the ith image frame according to the back light adjusting parameter corresponding to the current brightness ratio. Finally, the display module 24 displays the ith image frame of the image sequence 10 according to the adjusted output back light.

For example, when the current environmental light sensed by the optical sensing module 12 is $EL_2$, and the current brightness ratio of the ith image is $BR_4$, the image processing module 18 determines the back light adjusting parameter $P_{24}$ corresponding to the current brightness ratio $BR_4$ according to the current environmental light $EL_2$, the current brightness ratio $BR_4$, and the look-up table 160. Then, the back light module 22 adjusts the output back light relative to the ith image frame according to the back light adjusting parameter $P_{24}$. Finally, the display module 24 displays the ith image frame of the image sequence 10 according to the adjusted output back light. Therefore, the adjusting brightness apparatus 1 of the present invention adjusts the output back light relative to the image frame according to both the change of the environmental light and the brightness of the image frame, so as to effectively enhance the contrast when both the environmental light and the image frame are dark.

For some display systems, the image frames of the image sequence 10 will be converted with a gamma conversion 26 to enhance the image contrast before displayed by the display module 24.

Figure 3:
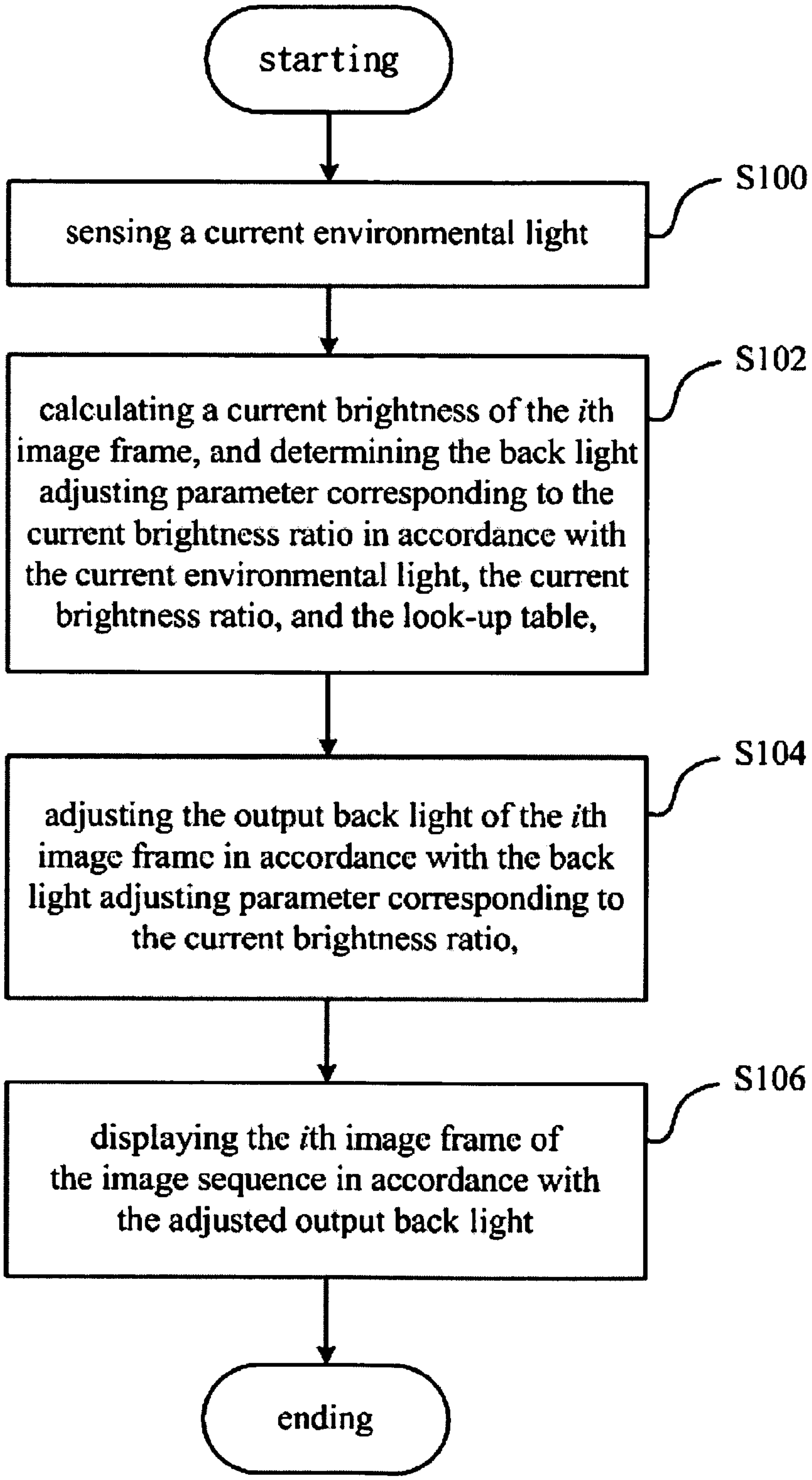
FIG. 3 is a flow chart of the adjusting brightness method according to the preferred embodiment of the present invention.

Referring FIG. 3, FIG. 3 is a flow chart of the adjusting brightness method according to the preferred embodiment of the present invention. Referring to FIG. 1 and FIG. 2 together with FIG. 3, the adjusting brightness method is used for adjusting an output back light relative to the ith image frame of an image sequence inputted to a display system. According to the preferred embodiment, the adjusting brightness method of the invention includes the steps of:

step S100: sensing a current environmental light;

step S102: calculating a current brightness ratio of the ith image frame, and determining the back light adjusting parameter corresponding to the current brightness ratio in accordance with the current environmental light, the current brightness ratio, and the look-up table;

step S104: adjusting the output back light relative to the ith image frame in accordance with the back light adjusting parameter corresponding to the current brightness ratio; and step S106: displaying the ith image frame of the image sequence in accordance with the adjusted output back light.

Comparing with the prior art, the adjusting brightness apparatus of the present invention adjusts the output back light relative to the image frame according to both the change of the environmental light and the brightness of the image frame, so as to effectively enhance the contrast when both the environmental light and the image frame are dark. Therefore, the quality of the image is improved.

With the example and explanations above, the features and spirits of the invention will be hopefully well described. Those skilled in the art will readily observe that numerous modifications and alterations of the device may be made while retaining the teaching of the invention. Accordingly, the above disclosure should be construed as limited only by the metes and bounds of the appended claims.

What is claimed is:

1. An adjusting brightness apparatus for adjusting an output back light relative to the ith image frame among N image frames of an image sequence inputted to a display system, N being a natural number, i being an integer index ranging from 1 to N, said adjusting brightness apparatus comprising:

an optical sensing module for sensing a current environmental light;

a memory unit for storing a look-up table in which a plurality of environmental light values, a plurality of brightness ratios, and a plurality of back light adjusting parameters are recorded, each of the environmental light values corresponding to the brightness ratios and the back light adjusting parameters, each of the back light adjusting parameters corresponding to one of the brightness ratios;

an image processing module for receiving the current environmental light to calculate a current brightness ratio of the ith image frame, and determining, according to the current environmental light, the current brightness ratio, and the look-up table, the back light adjusting parameter corresponding to the current brightness ratio; and a back light module for receiving the back light adjusting parameter corresponding to the current brightness ratio, and adjusting the output back light relative to the ith image frame in accordance with the back light adjusting parameter corresponding to the current brightness ratio.

2. The adjusting brightness apparatus of claim 1, further comprising an analog-to-digital converter (A/D converter), coupled between the optical sensing module and the image processing module, the A/D converter converting an analog signal outputted from the optical sensing module to a digital signal.

3. The adjusting brightness apparatus of claim 1, further comprising a digital-to-analog converter (D/A convert), coupled between the image processing module and the back light module, the D/A converter converting a digital signal outputted from the image processing module to an analog signal.

4. The adjusting brightness apparatus of claim 1, further comprising a display module for displaying the ith image frame among the N image frames of the image sequence in accordance with the adjusted output back light.

5. The adjusting brightness apparatus of claim 4, wherein the ith image frame is converted with a gamma conversion to enhance an image contrast thereof before displayed by the display module.

6. The adjusting brightness apparatus of claim 1, wherein the image frames of the image sequence are in RGB color space.

7. An adjusting brightness method for adjusting an output back light relative to the ith image frame among N image frames of an image sequence inputted to a display system, N being a natural number, i being an integer index ranging from 1 to N, said adjusting brightness method comprising:

sensing a current environmental light;

calculating a current brightness ratio of the ith image frame, and determining the back light adjusting parameter in accordance with the current environmental light, the current brightness ratio, and a look-up table in which a plurality of environmental light values, a plurality of brightness ratios, and a plurality of back light adjusting parameters are recorded, each of the environmental light values corresponding to the brightness ratios and the back light adjusting parameters, each of the back light adjusting parameters corresponding to one of the brightness ratios; and adjusting the output back light relative to the ith image frame in accordance with the back light adjusting parameter corresponding to the current brightness ratio.

8. The adjusting brightness method of claim 7, further comprising the step of:

displaying the ith image frame among the N image frames of the image sequence in accordance with the adjusted output back light.

9. The adjusting brightness method of claim 8, wherein the ith image frame is converted with a gamma conversion to enhance an image contrast thereof before displayed.

10. The adjusting brightness method of claim 7, wherein the image frames of the image sequence are in RGB color space.

* * * * *